United States Patent [19]
Nachtigall et al.

[11] Patent Number: 4,884,928
[45] Date of Patent: Dec. 5, 1989

[54] BELT BINDER FOR CARGO BINDER CHAINS

[76] Inventors: Ronnie Nachtigall, P.O. Box 756, Eagle, Id. 83616; Frank N. Fisher, 2831 N. 15th St., Meridian, Id. 83642

[21] Appl. No.: 282,867

[22] Filed: Dec. 9, 1988

Related U.S. Application Data

[63] Continuation of Ser. No. 106,392, Oct. 9, 1987, abandoned.

[51] Int. Cl.$^4$ .................. B61D 45/00; B65D 63/00
[52] U.S. Cl. ............................ 410/103; 410/100
[58] Field of Search .................. 410/96–98, 410/100–103, 106, 108, 115, 116, 34

[56] References Cited

U.S. PATENT DOCUMENTS

| | | | |
|---|---|---|---|
| 3,290,010 | 12/1966 | Holmes | 410/97 X |
| 3,697,045 | 10/1972 | Farley | 410/103 |
| 3,848,889 | 11/1974 | Sharrow | 410/103 |
| 3,910,558 | 10/1975 | Brucker et al. | 410/103 |
| 4,045,002 | 8/1977 | Miller | 410/103 |
| 4,229,131 | 10/1980 | Hague | 410/103 X |
| 4,314,783 | 2/1982 | Parnell et al. | 410/103 X |
| 4,358,232 | 11/1982 | Griffith | 410/100 |
| 4,367,993 | 1/1983 | Meigs | 410/103 |
| 4,369,009 | 1/1983 | Fulford | 410/103 X |
| 4,382,736 | 5/1983 | Thomas | 410/103 X |
| 4,428,099 | 1/1984 | Richmond | 410/103 X |
| 4,510,652 | 4/1985 | Van Iperen | 410/103 X |
| 4,527,309 | 7/1985 | Kawahara | 410/103 X |

FOREIGN PATENT DOCUMENTS 1281518  7/1972  United Kingdom ................ 410/100

*Primary Examiner*—Douglas C. Butler
*Attorney, Agent, or Firm*—Frank J. Dykas

[57] ABSTRACT

Combination belt binder for securing and tensioning cargo binder chain, wherein the combination belt binder has an odd number of links of chain attached, by a "D" or "V" ring to a length of standard cargo belt binder. Attached to the other end of the cargo binder chain is a chain hook for attachment to a standard cargo binder chain, and further where the belt binder is suitable for use with standard slotted spindle and ratchet assemblies normally used to secure and tension standard cargo belt binders.

1 Claim, 3 Drawing Sheets

BELT BINDER FOR CARGO BINDER CHAINS

This is a continuation of application Ser. No. 106,392, filed on Oct. 9, 1987, now abandoned.

BACKGROUND OF THE INVENTION

1. Technical Field

This invention relates generally to load binders and more particularly to a new and improved strap and chain combination binder for securely fastening structural steel, heavy equipment or other cargo for vehicular transport which is not amendable for securing with conventional loading straps.

2. Background Art

Huge quantities of various cargos are shipped from point to point within the United States by truck. Some of it is carried within enclosed cargo trailers, and some upon flatbed trailers. That which is carried on flatbed trailers has to be anchored in some manner to prevent the shifting or loss of the cargo.

There are various types of binders in use today to secure cargo to a flatbed trailer truck. These are binder chains, which are metal chains of the same genre of manufacture as logging chains, and binder belts. Binder belts are preferred for a number of very good reasons some of which are the facts that the belts are a lighter weight, more flexible, easier to install, and easier to secure.

Typically binder belts are secured by means of spindles attached to ratchet and pawl assemblies, which are either welded or bolted, to the perimeter of the flatbed trailer frame. The binder belt is inserted, at one end into a slot in the spindle, and the spindle is then rotated to take up in a wrap a length of the belt. The remainder of the belt is then tossed over the top of the load and taken up in the corresponding slotted spindle crank assembly on the other side of the trailer. The binder belts have sufficient resiliency to accommodate reasonable shifting and settling of cargo loads during the course of transport.

Sometimes the use of binder belts is not feasible. In particular it is not feasible when the cargo carried is made of metal and has sharp edges, such as a cargo of structural steel. In these cases a cargo binder chain must be substituted for the belts.

Binder chain is much heavier and there is no spindle ratchet equivalent readily available to the trucker to adjust the tension of the cargo binder chain. As a result, the most common method of adjusting the tension is to use a standard chain binder which is connected to two fixed points on the cargo chain, and then by leveraged action, is used to pull the two set points on the chain closer together in order to tighten the chain.

The problem is that virtually all loads of cargo will shift and settle as the truck moves down the road. As a result the cargo binder chains usually slacken as the load settles, and oftentimes the chain binder will work loose, become unhooked and fall off. To prevent this condition from occurring, the truck driver, when using cargo binder chain, must stop frequently, especially during the earlier portion of the trip, to inspect, check and adjust tension on the cargo binder chains.

Another problem is operator safety when the operator is snapping the lever into locked position and releasing the chain binder. This is particularly true when using a pipe like extension for extra leverage. Also the chain binder is oftentimes set too high off the ground which requires the operator to climb up onto the trailer or load, as where belt binders can be adjusted by an operator standing on the ground. Belt binders are much safer and more convenient and quicker to use.

Another problem with the use of cargo binder chain, is that oftentimes there is no adequate method or location to fasten chain to the perimeter frame of the flatbed trailer. This is especially true if there are no eyelets or cleats provided on the trailer for the use of chain.

What is needed is an apparatus which enables the truck operator to use cargo binder chain in conjunction with the spindle and ratchet assemblies integral with the trailer perimeter frame so as to eliminate the inadequacy of location and design of binder chain connections. And further, to incorporate the resilient characteristics of the binder belt so as to reduce the need for frequent stops to check and adjust tension on the binder chains.

A number of devices have been developed over the years which attempt to incorporate some of these desirable features. For example, U.S. Pat. No. 3,290,010 shows the combination of straps and chain for securing cargo to the bed of a flatbed trailer. This device does disclose the use of chain around the sharp edges of the cargo, and the use of a resilient strap to maintain tension on the binder system, but, it utilizes eyelet type tie downs on the flatbed trailer, and a portable winch assembly located atop the cargo being carried. This type of a tie down system will not work for all types of loads, is extremely bulky, requires portable power sources, and most importantly, does not utilize features already found on a flatbed trailer, namely the spindle and ratchet assemblies attached to the perimeter frame.

It appears that the present invention contributes substantially to the needed improvements, particularly as to weight and ease of use considerations.

DISCLOSURE OF INVENTION

To obtain these objects the present invention envisions a binding belt or strap with limited resiliency being attached by stitching or other well known means to one side of a "D" or "V" shaped and closed metal ring having a smooth rounded surface and concerns. This "D" or "V" ring, in turn is connected mechanically in an understood manner to the leading or end link of a load binding chain of common design. The other end of the load binding chain is linked mechanically by an obvious method to a metal hook which may be secured in an understood manner to cargo binder chain. To secure a load on the bed of a carrier the hook on the load binding chain first may be loosely secured to a suitable stationary fastening point. The load binder chain is then passed over the designated cargo in an understood manner to reach the proximity of the tie down position where the load binder strap will be secured. The load binder strap is then introduced into the slot in cylinder drum which is operably attached in a well known manner to a conventional ratchet wheel and pawl assembly conventionally mounted and secured to the perimeter frame of the trailer. The ratchet and drum are rotated in a circular manner by a lever arm and handle in a conventional manner to wrap and unwrap the load binder strap about the drum, thereby tightening or loosening the load binder system as desired. The chain attached to the strap is selected to contain an uneven number of links in order that when the load binder chain hook is in place the load binder strap may lie parallel to the surface of the drum while encircling the drum. A suitable length of load binder strap is chosen to provide sufficient resiliency and adjustability to hold the load securely while in transit. Under normal foreseeable conditions the load binder strap serves as an adjustable adapter to the load binder chain which permits the load binder chain to confine loads having irregular shapes or sharp edges without damage to the strap and to accommodate minor shifts or settling of the cargo during transit without creating a dangerous or unsafe condition.

For a better understanding of the invention and its operating advantages reference should be made to the accompanying drawings and specifications of a preferred embodiment.

BEST MODE FOR CARRYING OUT INVENTION

Figure 1:
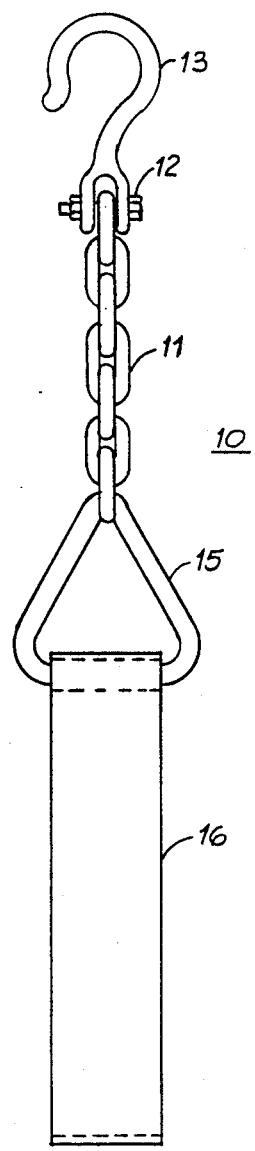
FIG. 1 is a representational drawing of the belt binder for cargo binder chain.
Figure 2:
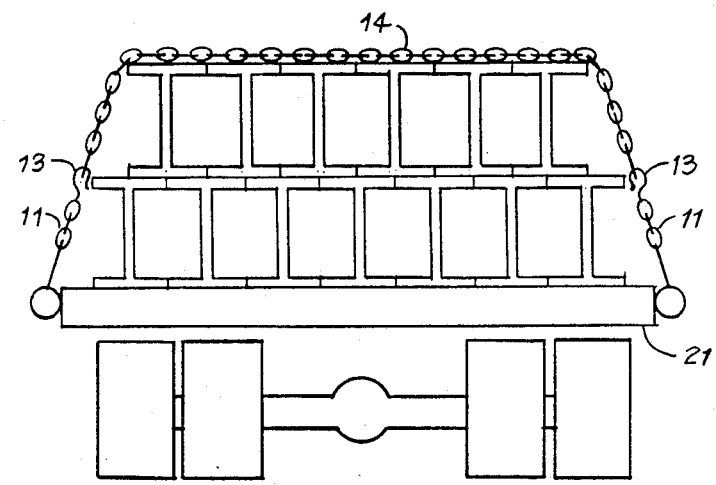
FIG. 2 is a representational end view of a cargo binder chain in use with two of the belt binders for cargo binder chains.
Figure 3:
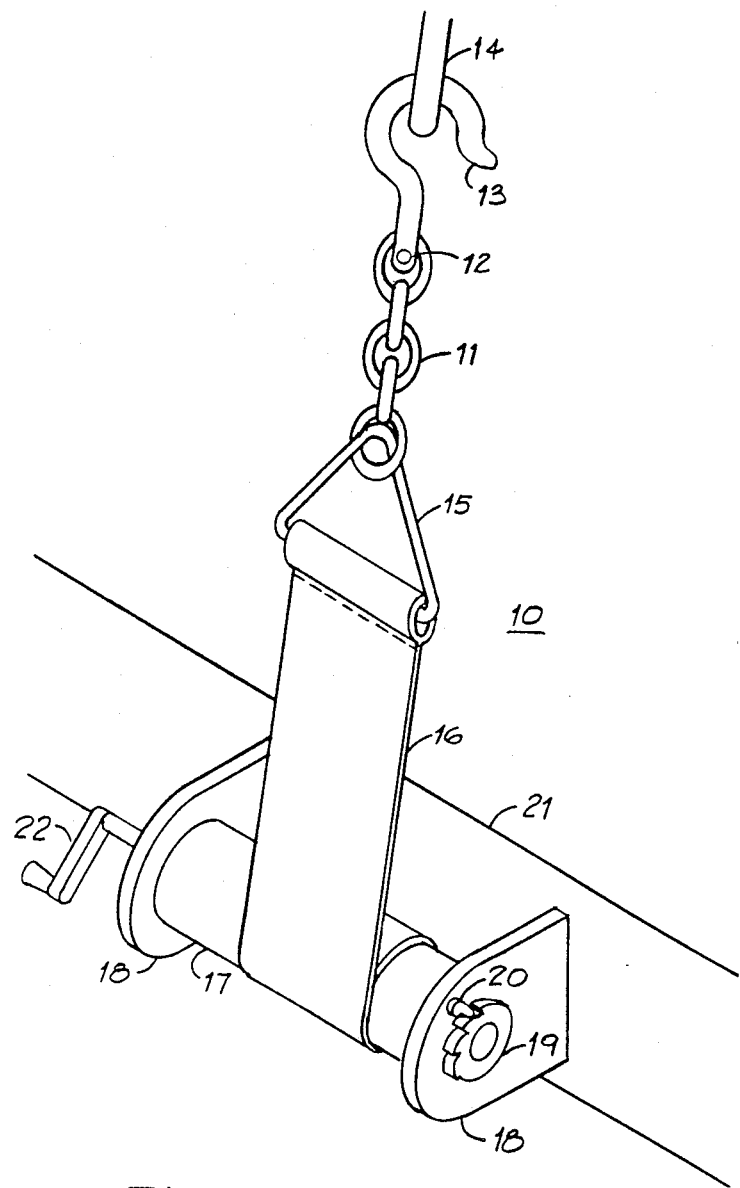
FIG. 3 is a representational perspective view of the belt binder for cargo binder chains attached to a spindle and ratchet assembly.

With reference to FIGS. 1, 2 and 3, a new and improved combination strap chain load binder embodying the principles and concepts of the present invention and generally designated by the reference numeral 10 will be described.

It can be seen that the load binder system is designed to include a load binder chain 11 of conventional design mechanically connected at one end in an understood manner by means of a removable bolt and nut assembly 12 to a standard metal hook 13 which is removably connected by conventional means to a cargo binder chain 14. The other end of the load binder chain 11 is connected mechanically to a standard metal "D" or "V" ring 15 which is further connected on its straight portion by stitching or other standard means to load binder strap 16. Binder strap 16 is composed of nylon, cotton or other strong and flexible fiber webbing of high tensile and tear strength and limited resiliency as well as wear and abrasion resistance and mildew resistance. Binder strap 16 is detachably connected in a well known manner to a standard metal spindle 17 rotatably mounted on end plates 18 which are usually welded or bolted to a fixed point on the perimeter frame of trailer 21. Spindle 17 is part of a conventional ratchet wheel 19 and pawl 20 assembly which may be rotatably turned by crank 22 to tighten or loosen the binder strap 16 which is circumferentially wrapped, in an understood way around spindle 17. The length of the binder strap 16 is selected to provide, when tightened, sufficient resiliency within stretched strap 16 and compressibility within the circumscribed strap to accommodate reasonable shifting and settling of the cargo which is being held primarily by cargo binder chain 14. The ratchet wheel 19 and pawl 20 assembly will normally contain sufficient teeth to permit adequate adjustment of the strap chain binder combination to secure the cargo properly for transit and is a common accessory on most cargo carriers.

Referring particularly to FIG. 2, it can be seen that the belt binder for truck cargo binder chain can be used in pairs to secure cargo binder chain 14, such as the one shown securing a load of large structural I-beams. As can be seen in FIG. 2, the belts 16 do not come in contact with the sharp edges of the cargo, and thereby are not subjected to the possibility of abrasion and possible breakage. Yet, at the same time, the resilient characteristics and the flexible characteristics of belts 16 are used to full advantage.

With respect to the above description then, it should be realized that the optimal dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specifications are intended to be encompassed in the present invention. Since numerous modifications and changes will readily occur to those skilled in the art, it is not desired to limit the invention to the exact construction and operation shown and described and accordingly, all suitable modifications and equivalents may be resorted to, falling within the scope of the invention.

What I claim is:

1. A belt binder means for securing and for tensioning cargo chains around the cargo of a cargo trailer which cargo trailer requires cargo chains, the binder means comprising a pair of end plates secured to the cargo trailer; a spindle means rotatably attached between said end plates and having a slot disposed therein parallel to the axis of rotation; said spindle means having a ratchet wheel coaxially secured to said spindle means, the wheel having a sufficient number of teeth to facilitate small adjustments; and a pawl means pivotally attached to one of said pair of end plates and engaged with the teeth of said ratchet wheel; a binder strap being constructed of a strong, flexible fiber webbing and having a first end inserted in the slot of said spindle means; a "D" or "v" ring attached to a second end of said binder strap; a segment of cargo chain having a first end attached to said "d" or "V" ring; and a hook attached to a second end of said cargo chain segment for detachably engaging the cargo chain disposed around the cargo, said belt binder means providing ready access by placement remote from the top of the load to allow retensioning of the chains even after the cargo has been tarped, if a tarp is used; said binder means providing a limited elastic strength accommodating some load shifting to thus reduce the accidental release of tensional forces by road vibrations or the like.

* * * * *